UNITED STATES PATENT OFFICE.

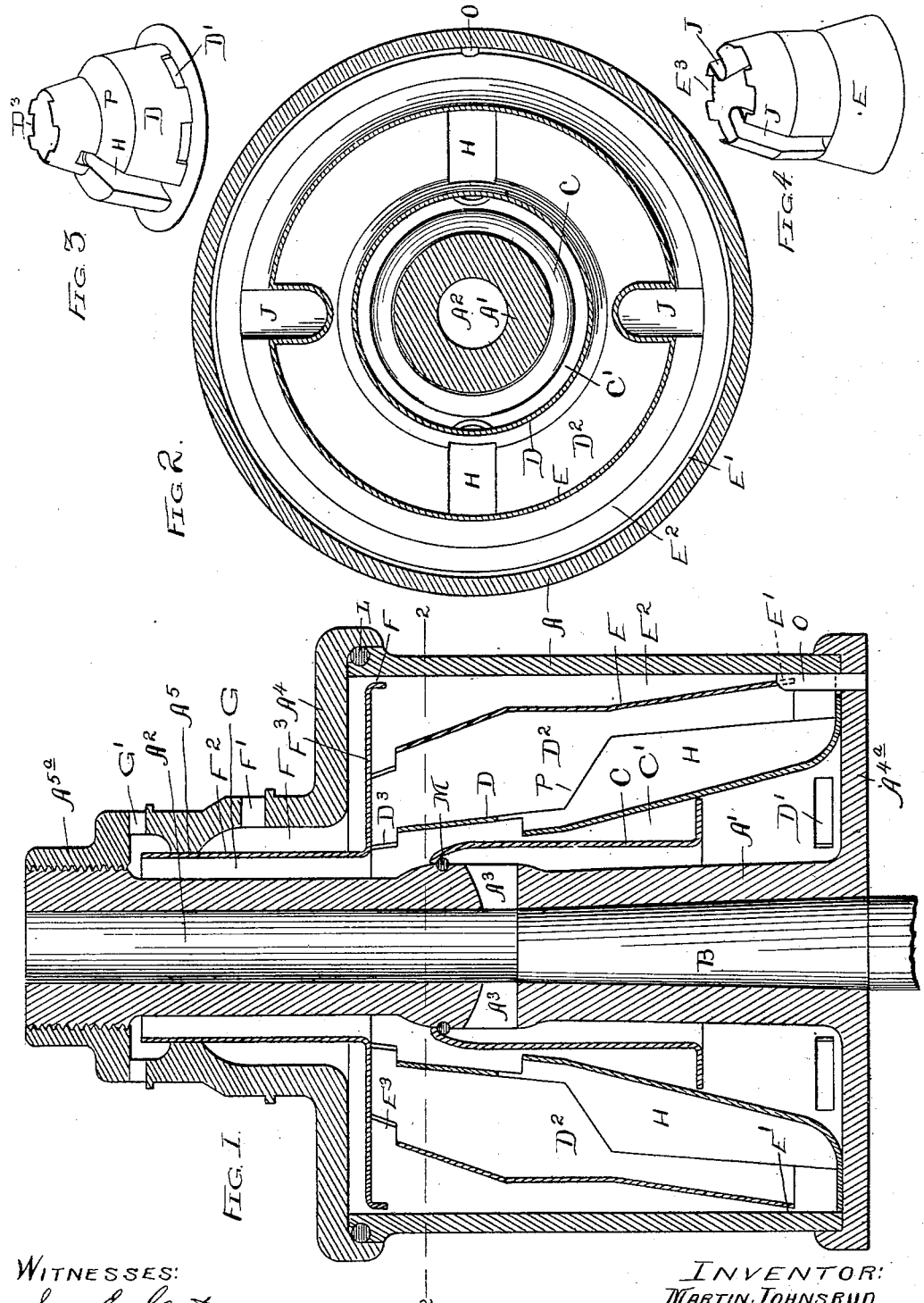

MARTIN JOHNSRUD, OF CHICAGO, ILLINOIS.

CENTRIFUGAL CREAM-SEPARATOR.

SPECIFICATION forming part of Letters Patent No. 632,464, dated September 5, 1899.

Application filed June 10, 1898. Serial No. 683,052. (No model.)

*To all whom it may concern:*

Be it known that I, MARTIN JOHNSRUD, a citizen of the United States, residing in Chicago, in the county of Cook and State of Illinois, have invented a new and useful Improvement in Centrifugal Cream-Separators, of which the following is a specification.

This invention relates to improvements in centrifugal cream-separators designed to increase the efficiency of such machines, more especially by providing avenues for the easy and quick escape of the separated cream from the other constituents of the milk.

The nature of the invention is fully set forth in the description which I give below and will also be understood from the accompanying drawings, wherein—

Figure 1 is a vertical section of my improved separator. Fig. 2 is a horizontal section on the line 2 2 of Fig. 1; and Figs. 3 and 4 are detail perspectives of the inner and outer cones, respectively.

In said drawings, A represents the bowl, supported upon the shaft B and having a central hub $A'$, having a central opening at the bottom to receive the shaft B and a central feed-passage $A^2$ at the top. Lateral passages $A^3$ allow the entering milk to escape from passage $A^2$ into the bowl. An annular or cylindrical guide C surrounds the entrances $A^3$ and conducts the milk to the bottom of the bowl. Outside of the guide-cylinder C is a cone D, having openings $D'$ at its bottom, through which the milk and cream pass into the surrounding space $D^2$ formed between the cone D and a second and outer cone E. The cone D extends to the bottom of the bowl, while the cone E is somewhat shorter, and at its bottom cone E is also slightly smaller than the interior diameter of the bowl, so as to leave a passage at $E'$, through which the major portion of the blue milk will pass into the annular space $E^2$ outside of cone E. The separation mainly takes place at the bottom of the space $D^2$, and consequently said space $D^2$ will be mainly filled with the cream.

At the top of the cone E is an opening $E^3$, through which any milk in space $D^2$ may pass outward and flow off, together with that from space $E^2$, through the annular passage F, having an outer opening at $F'$, this passage F being formed between the cap $A^4$ of the bowl and the cylinder $F^2$, having a right-angled flange $F^3$. The cylinder $F^2$ effects a close junction with the interior of the cap $A^4$ at the point $A^5$, so that the blue milk cannot rise beyond that point, but must flow out at $F'$. The cone D is also provided with top openings at $D^3$, through which the cream may pass into the annular passage G, the outside of which is formed by the cone D and the cylinder $F^2$ and the inside by the guide-cylinder C and the hub $A'$ of the bowl. From the passage G the cream will flow to the outlets $G'$. Should any cream separate from the milk in the space $E^2$ it will find its way through openings $D^3$ and $E^3$. The space $C'$ existing between the guide-cylinder C and the interior of cone D will of course become filled and any blue milk therein will be apt to find its way outward through openings $D^3$ and $E^3$, while the cream therein will move upward into passage G.

In order to facilitate the separation of the cream from the blue milk, I provide one or both of the cones D and E with sunken vertical channels, through which the cream may escape from the blue milk into the space G or into proximity to the openings leading thereto. I prefer to employ these vertical channels in both cones, those in the cone D being shown at H H and those in the cone E being shown at J J. I prefer also to employ two of each of these vertical channels and to arrange the channels J J between rather than opposite the channels H H, though of course the number and relative locations may be varied. These channels are all sunken inwardly from the outer surfaces of the cones and they are also open at the top, as seen in the case of the channels H, which open directly into the cream-passage G. The channels J discharge the cream in proximity to the openings $E^3$.

The bowl is preferably provided with a separate bottom $A^{4a}$ and a nut $A^{5a}$, threaded upon the hub $A'$ and setting down against the cap $A^4$.

I find by the use of apparatus constructed as above described that I accomplish not only a very quick separation, but also a very perfect one. The apparatus is also simple and economical of manufacture.

The joint between the body of the bowl and the cap $A^4$ is rendered tight by means of a packing-ring L. This packing-ring rests in a circular groove on the outside of the body of the bowl, and the cap is provided with a downward flange setting over the ring. In this manner the ring does not become detached or lose its position when the parts of the bowl are separated and is always ready for use. At the same time should any of the milk work its way out of the bowl at this joint by centrifugal action it will be intercepted by the ring and prevented from escape.

The cylinder or shell C is supported upon a rubber ring M, let into the exterior surface of the bowl-hub, as shown, the upper edge of the shell being bent inward so as to reduce its diameter sufficiently to enable it to rest upon the ring. This ring also prevents the rising of the milk from the openings $A^3$ by rendering the joint between the shell and the hub sufficiently close.

A pin O extends upward through the bottom of the bowl and enters notches in the cones D and E, and I thus insure their rotation with the bowl. It will be noticed that the inner cone is provided with a central zone P of greater taper than the portions above or below it, the lower portion being of the larger diameter. This feature facilitates the separation, because the heavier parts of the milk are apt to remain upon the larger diameter portion of the cone. This shoulder may be duplicated, if it is desired, in the outer cone.

It will be noticed that the sunken vertical channels incline inward and upward, so that the cream will rise freely in them and pass out of them at the open tops; also that the side walls of the channels form abrupt angles with the outer faces of the cones, and the channels are thereby adapted to retain the cream which enters them until it has passed out over the tops of the channels; also that no opportunity to escape from the channels is given the cream except at the top.

I claim—

1. The bowl of a centrifugal cream-separator, having an interiorly-located plain-surfaced cone D receiving the milk upon its exterior surface and provided upon such surface with a deep, sunken, vertical channel acting to gather the cream from such milk and to deliver it at the end of the channel and inside the cone, substantially as specified.

2. The bowl of a centrifugal cream-separator having an interiorly-located plain-surfaced cone D receiving the milk upon its exterior surface and provided upon such surface with a deep, sunken, vertical channel acting to gather the cream, said channel being closed against the escape of the cream except at the top, substantially as specified.

3. The bowl of a centrifugal cream-separator having an interiorly-located plain-surfaced cone D receiving the milk upon its exterior surface and provided upon such surface with a deep, sunken, vertical channel acting to gather the cream, said channel being inclined inwardly and upwardly and giving egress to the cream at its top only, substantially as specified.

4. The bowl of a centrifugal separator provided with a central inlet, a guide-cylinder C surrounding the inlet, a cone D outside said cylinder, and having openings D' and a sunken channel H, a second and outside cone E having a sunken channel J, and separate exits for the cream and blue milk, substantially as specified.

5. The combination in the bowl of a centrifugal separator, with the hub, and the guide-cylinder C carried by the hub, of the soft packing-ring M let into the hub and serving both to render the joint between the hub and cylinder tight, and to support the latter, substantially as specified.

6. The combination with the bowl of a centrifugal cream-separator, of a cone D having a gently-tapering lower zone, an abruptly-tapering zone P located centrally between the top and bottom of the cone, and a gently-tapering upper zone, substantially as specified.

MARTIN JOHNSRUD.

Witnesses:
EDWARD S. EVARTS,
H. M. MUNDAY.